United States Patent
Happle

(10) Patent No.: US 7,984,535 B2
(45) Date of Patent: Jul. 26, 2011

(54) MOUNTING STRIP FOR MOUNTING A FORMED PART ON A CHASSIS BODY OF A MOTOR VEHICLE

(75) Inventor: Wolfgang Happle, Grenzach-Wyhlen (DE)

(73) Assignee: Peguform GmbH, Bötzingen (DE)

( * ) Notice: Subject to any disclaimer, the term of this patent is extended or adjusted under 35 U.S.C. 154(b) by 0 days.

(21) Appl. No.: 12/867,837

(22) PCT Filed: Feb. 4, 2009

(86) PCT No.: PCT/EP2009/000708
§ 371 (c)(1),
(2), (4) Date: Aug. 16, 2010

(87) PCT Pub. No.: WO2009/106210
PCT Pub. Date: Sep. 3, 2009

(65) Prior Publication Data
US 2010/0316464 A1 Dec. 16, 2010

(30) Foreign Application Priority Data

Feb. 28, 2008 (EP) ..................................... 08003658

(51) Int. Cl.
*F16B 5/12* (2006.01)
(52) U.S. Cl. ...................................................... 24/297
(58) Field of Classification Search ............ 24/289–297; 52/716.5–716.7, 718.05–718.03; 411/508–510
See application file for complete search history.

(56) References Cited

U.S. PATENT DOCUMENTS

| | | | | | |
|---|---|---|---|---|---|
| 3,775,927 | A | * | 12/1973 | Meyer | 52/718.06 |
| 4,363,839 | A | * | 12/1982 | Watanabe et al. | 428/31 |
| 4,364,591 | A | * | 12/1982 | Bien | 293/102 |
| 4,388,355 | A | * | 6/1983 | Ikemizu | 428/31 |
| 4,869,937 | A | * | 9/1989 | Nagata et al. | 428/31 |
| 5,086,603 | A | * | 2/1992 | Graf et al. | 52/716.6 |
| 5,186,509 | A | * | 2/1993 | Tyves | 52/716.5 |
| 5,229,175 | A | * | 7/1993 | Seabolt | 428/31 |
| 5,368,903 | A | * | 11/1994 | Trier | 428/31 |

FOREIGN PATENT DOCUMENTS

| | | |
|---|---|---|
| DE | 295 20 573 U1 | 2/1996 |
| DE | 198 03 402 A1 | 8/1998 |
| DE | 197 12 856 A1 | 10/1998 |

* cited by examiner

*Primary Examiner* — James R Brittain
(74) *Attorney, Agent, or Firm* — Ursula B. Day; Henry M. Feiereisen

(57) ABSTRACT

A mounting strip for mounting a formed part on a body of a motor vehicle includes a strip-shaped basic body, a plurality of pins formed directly at the rear side of the basic body as locking elements for holding the mounting strip in corresponding openings in the motor vehicle body; and attachment elements formed at the front side of the basic body for receiving and holding in place the formed part, wherein the mounting strip comprises weakened areas located in direct proximity to the formed on pins and including ribs extending vertical relative to the longitudinal direction of the mounting strip.

7 Claims, 2 Drawing Sheets

MOUNTING STRIP FOR MOUNTING A FORMED PART ON A CHASSIS BODY OF A MOTOR VEHICLE

CROSS-REFERENCES TO RELATED APPLICATIONS

This application is the U.S. National Stage of International Application No. PCT/EP2009/000708, filed Feb. 4, 2009, which designated the United States and has been published as International Publication No. WO 2009/106210 and which claims the priority of European Patent Application No. 08 003658.5, filed Feb. 28, 2008, pursuant to 35 U.S.C. 119(a)-(d).

BACKGROUND OF THE INVENTION

The present invention refers to a mounting strip for mounting a formed part on a body of a motor vehicle whereby the mounting strip comprises a strip-shaped basic body.

Generic mounting arrangements are known in multiple embodiments for the attachment or mounting of formed parts, such as a bumpers, paneling or cover strips. Oftentimes single clips are utilized for these purposes, which are applied separately at the vehicle body and onto which the mounting arrangement or the mounting strip is attached. A disadvantage of this arrangement is the relatively extensive mounting work, since each single attachment a clip has to be attached to the auto body. A further disadvantage lies in the fact that due to tolerance fluctuations the single clips, with respect to their part that has to be mounted, do not always provide locational exactness, which makes mounting more difficult and which also can make the mounted part look unsightly, because in such a case, the joint between the formed part and the vehicle body follows an irregular pattern.

There have been attempts to remedy this disadvantage, in particular, to avoid the extensive mounting effort such that the use of separate mounting parts has been abandoned and lock elements were instead provided at the formed part by means of which the formed part could be attached directly at the vehicle body. Thus, DE 295 20 573 U1 describes an ornamental strip or bumper strip, which are made of thermoplastic material and which are provided at their rear side with attachment elements that are configured as lock elements for engagement in openings of the vehicle body. In this manner, while the mounting work can thus be facilitated, the problem with precisioning the position of the formed parts is thereby not solved, as such formed parts are normally unitary pieces of relatively large dimension and the imprecision of their positioning is even increased due to tolerance fluctuations that occur during manufacturing.

In addition, in the case where large-dimensioned formed parts of plastic material are involved that include lock elements directly formed at the formed part and which are to be attached for example at metal parts of the vehicle body, the different thermal expansions of metal and plastic have a negative impact and are especially noticeable. Also, formed or molded parts form plastic material that are very precisely adapted with little tolerance can cause the formation of cracks due to the differential thermal expansion, whereby finally the stability of the attachment is in peril. On the other hand, attempts to balance this disadvantage with increased tolerances jeopardizes the precision in positioning the part DE 198 03 402 A1 discloses an attachment arrangement, which again provides for a separate mounting part but the mounting has increased user friendliness which is realized in that the separate mounting part is configured as a mounting strip, which also includes that coupling elements are provided at the strip, which elements are for engagement in recesses of the vehicle body. The mounting arrangement that is described there, while user-friendly and precisely located, can however still lead to problems due to the differential in the thermal expansion of metal and plastic. In addition, the attachment of a mounting strip at the vehicle body is relatively complex. Accordingly, it is provided that the mounting strip connects with the vehicle body via a keyhole system, whereby several mounting elements are mutually combined to realize a tight connection.

An object of the present invention is thus to provide a mounting arrangement for attachment of formed parts at the body of a vehicle which does not exhibit the drawbacks of the afore-discussed prior art.

SUMMARY OF THE INVENTION

A solution of the above object and others to the problem is to provide a mounting strip for mounting a formed part at the body of a motor vehicle having the features which include a strip-shaped basic body and a pin formed directly at the rear side of the basic body as a locking element for holding the mounting strip in corresponding openings in the motor vehicle body attachment elements directly formed at the front side of the basic body for receiving and holding in place the formed part characterized in that the mounting strip comprises weakened areas located in direct proximity to the formed on pins and including ribs extending vertical relative to the longitudinal direction of the mounting strip. Further advantageous features and developments are the subject of the dependent claims.

Subject of the invention is a mounting strip which includes a strip-shaped basic body with pins which are configured as locking elements and that are formed directly at the rear side of the basic body for holding the mounting strip in place in corresponding openings at the body of the vehicle. At the front side of the basic body guide tracks and snap-in tongues for receiving and fixing the respective formed part to be mounted at the vehicle body are provided. At the core of the invention is that certain weak areas are provided at the mounting strip in direct proximity to the pins that are directly formed at the mounting strip and ribs extending vertically relative to the longitudinal extension of the mounting strip.

An advantageous embodiment provides that the ribs extend vertically relative to the longitudinal extension of the mounting strip and parallel to each other and are configured as rib-shaped webs that result from slot-shaped recesses in the strip.

The pins that are provided as locking elements are now formed directly at the ribs of the weakened areas. Thus the weakened areas have not only the function to compensate the different thermal expansion of metal and plastic, but also to adjust the tolerance fluctuations during manufacturing of the vehicle body.

The weakened areas together with the formed-on pins are disposed at predetermined distances at the mounting strip, whereby the ribs vertically extending relative to the lengthwise direction exhibit the full thickness of the mounting strip, while the areas between the ribs are weakened or are preferably formed as slot-shaped recesses.

As the attachment pins are formed directly at the ribs according the invention, the different thermal expansion that is generated is transmitted onto the ribs, which thus can yield due to the weakened areas in order to compensate any differences in the thermal expansion and without the stress at the mounting strip to the point where the formation of cracks in the plastic material occurs. The ribs are hereby formed so strong that the overall strength of the mounting strip is essentially not reduced. Since the weakened areas can compensate for stresses in the length direction, it is now also possible to install relatively simply constructed catch elements for attachment of the mounting strip at the vehicle body, because the catch elements themselves must no longer compensate or absorb any expansion differences due to their transmission into the weakened areas.

In this manner, it is possible to attach even formed parts of length dimensions at the vehicle body without any problems and without the danger that the attachment of the formed part will be compromised by the differential thermal expansion. Depending on the length dimension of the formed part to be mounted, it can be advantageous to utilize a mounting strip that does not correspond to the length of the formed part but that the mounting arrangement is distributed onto several smaller mounting strips that are serially mounted next to each other. Thus, the entire expansion difference is distributed onto each of the mounting strips, whereby the stresses to which the mounting strip is subjected are reduced.

An advantageous embodiment of the mounting pins provides that they are configured as equal-sided cones with open sides whereby the open sides of the pin are arranged in a bridge-like manner between two neighboring webs and formed directly onto them. With these features of the pin a simple assembly and disassembly of the mounting strip is realized, since the so-configured pins are easily pressed together for engagement into or removal from the engagement openings.

A simple and thus preferred embodiment of the present invention provides that a weakened area comprises webs that are formed by means of two slot-shaped recesses, and at whose rear side the pin provided as a locking element is directly formed thereon. This pin is configured, as already afore-described, as bridge between the two webs.

Mounting strips of this type are normally formed as an injection molded part of thermoplastic plastic material from the group of polypropylene (PP), polyethylene (PE), polybutylene-terephthalate (PBT), polyamid (PA), polystryrene (S), polycarbonate (PC), polymethyl-methacrylate (PMMA), Acrylnitril-butadiene-styrene (ABS), acryl-nitril-butadiene-stryrene/polycarbonate-co-polymerisate (ABS-PC) or polyoxymethylene (POM). Depending on the stresses to which the mounting strip is exposed, additional reinforcement fibers can be added to the plastic material, such fibers can be textile fibers, glass fibers or carbon fibers.

The mounting strips according to the invention are especially suited for formed parts having a length dimension for mounting at the body of a vehicle such as for example bumpers, paneling, facing strips or covers for door sills.

BRIEF DESCRIPTION OF THE DRAWING

The invention will be more readily explained by the following Figures. It is shown in:

FIG. 2 a perspective view of the rear side of a portion of the mounting strip with the formed part clamped in.

DETAILED DESCRIPTION OF PREFERRED EMBODIMENTS

Figure 1:
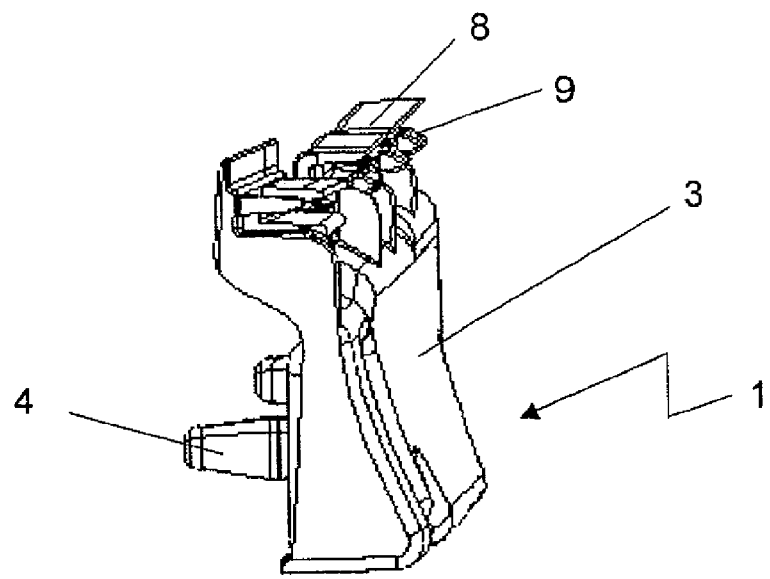
FIG. 1 a perspective side view of the mounting strip.

FIG. 1 shows in a perspective side view and overview of the mounting strip 1 with the extended strip-shaped basic body 3, which, in the upper region of the front side facing the formed part includes guide tracks 8 and snap-in tongues 9 for receiving and fixing formed part 2. At the side of the basic body 3 facing the vehicle body pins 4 are shown which act as locking elements for holding the mounting strip 1 in place in the corresponding openings in the vehicle body, whereby the pins 4 are directly formed onto the basic body 3.

Figure 2:
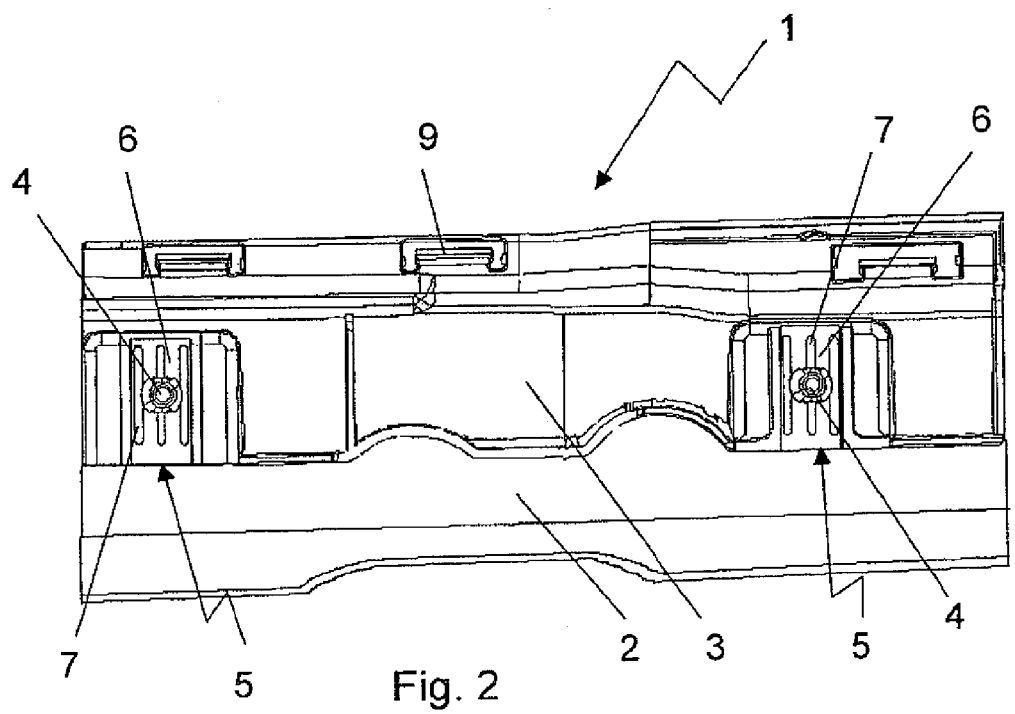

FIG. 2 shows a rear view of mounting strip 1 with the clamped-in formed part 2. In this top view, the weakened parts are seen with ribs 6 arranged vertical relative to the longitudinal direction and formed by means of slot-shaped recesses 7 that also extend vertical to the longitudinal direction. In the embodiment as shown in FIG. 2 of the present invention, three slot-shaped recesses 7 are provided, which form two rib-shaped webs 6 where the pin 4 for the attachment of the mounting strip at the vehicle body is directly formed onto. Furthermore, this illustration shows also the rear sides of the snap-in tongues 9 with which the form part 2 is fixed at the mounting strip.

Figure 3:
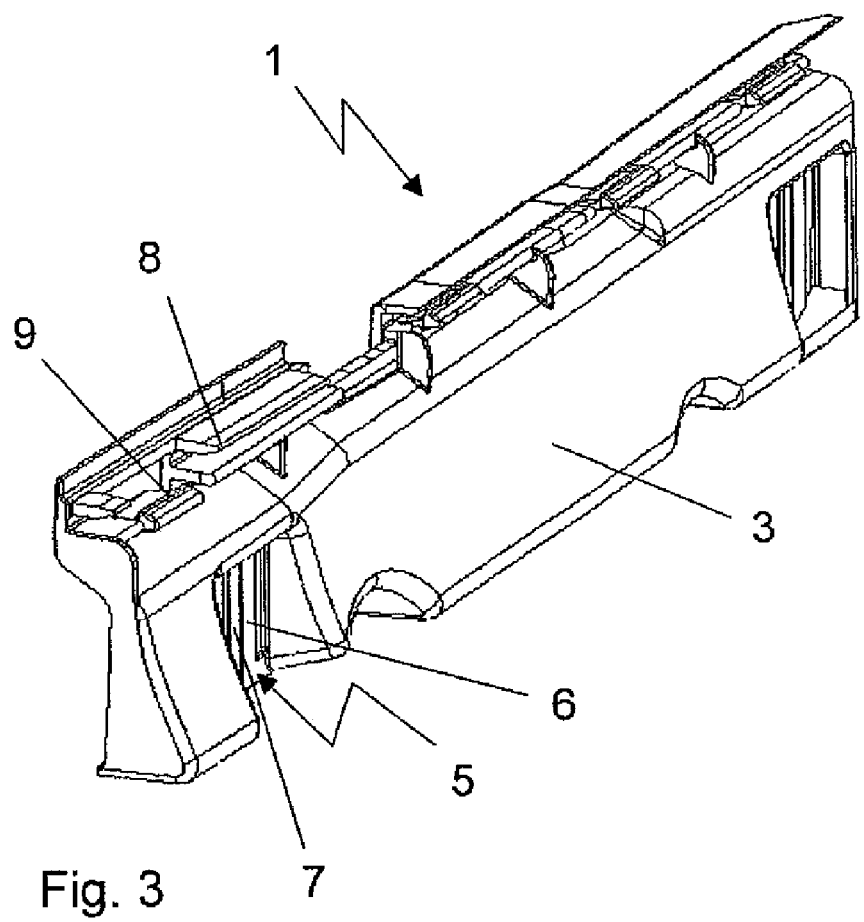
FIG. 3 a perspective view of the front side of the mounting strip.

FIG. 3 shows a perspective illustration of a front side of the mounting strip 1 according to the invention in a partial view. In this view, in the upper region of the basic body 3 of the mounting strip 1, guide tracks 8 and several snap-in tongues are seen that serve as attachment elements for receiving and attaching form part 2. The weakened areas 5 with rib-shaped webs 6 arranged vertical relative to the longitudinal direction and the corresponding slot-shaped recesses 7 are disposed as indentations in the lower area of the strip-shaped basic body 3.

Figure 4:
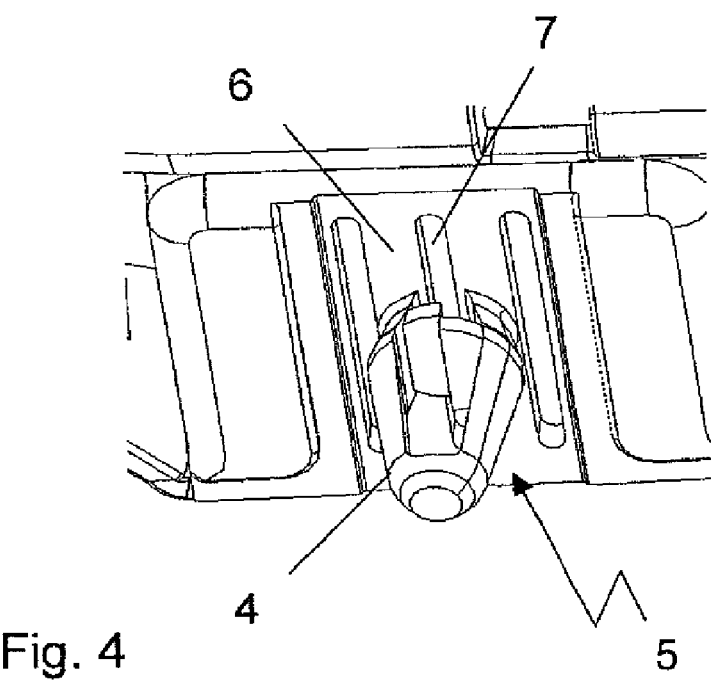
FIG. 4 a detail of the mounting strip showing the weakened area.

FIG. 4 shows a detail of a perspective illustration of the weakened area 5 with pin 4 configured as a locking element and constructed as an equal-sided laterally open cone formed directly at the rib-shaped webs 6, whereby the pin 4 forms a bridge between the two webs 6.

What is claimed is:

1. A mounting strip for mounting a formed part at the body of a motor vehicle, whereby the mounting strip comprises a strip-shaped basic body and
a plurality of pins pin formed directly at the rear side of the basic body as locking elements for holding the mounting strip in corresponding openings in the motor vehicle body;
attachment elements directly formed at the front side of the basic body for receiving and holding in place the formed part, wherein the mounting strip comprises weakened areas located in direct proximity to the formed on pins and including ribs extending vertical relative to the longitudinal direction of the mounting strip.

2. The mounting strip according to claim 1, wherein the ribs are rib-shaped webs formed by slot-shaped recesses and extending vertical relative to the longitudinal direction of the mounting strip and parallel to each other.

3. The mounting strip according to claim 1, wherein the pins provided as locking elements are directly formed at the ribs of the weakened areas.

4. The mounting strip according to claim 1, wherein the pins provided as locking elements are configured as open-sided, equilateral cones disposed in bridge-shaped manner between two neighboring webs and formed directly thereon.

5. The mounting strip according to claim 1, wherein each weakened area comprises two ribs formed as webs by slot-shaped recesses at whose rear side each of the pins configured as a catch element is directly formed, whereby each pin is disposed bridging between the two webs.

6. The mounting strip according to claim 1, wherein the attachment elements that are formed at the front side of the mounting strip comprise guide tracks and snap-in tongues.

7. The mounting strip according to claim 1, wherein each mounting pin is made from a thermoplastic material from the group of polypropylene, polyethylene, polybutylene-terephthalate, polyamid, polystyrene, polycarbonate, polymethylmethacrylate, acrylnitril-butadiene-styrene, acryl-nitril-butadiene-stryrene/polycarbonate-co-polymerisate or polyoxymethylene.

* * * * *